United States Patent
Alyahya et al.

(10) Patent No.: US 11,997,138 B1
(45) Date of Patent: May 28, 2024

(54) DETECTING AND ANALYZING PHISHING ATTACKS THROUGH ARTIFICIAL INTELLIGENCE

(71) Applicant: KING FAISAL UNIVERSITY, Al Hasa (SA)

(72) Inventors: Ahmed Alyahya, Al Hasa (SA); Mohammed Alzahrani, Al Hasa (SA)

(73) Assignee: KING FAISAL UNIVERSITY, Al Hasa (SA)

( * ) Notice: Subject to any disclaimer, the term of this patent is extended or adjusted under 35 U.S.C. 154(b) by 0 days.

(21) Appl. No.: 18/432,907

(22) Filed: Feb. 5, 2024

(51) Int. Cl.
*H04L 9/40* (2022.01)

(52) U.S. Cl.
CPC .................... *H04L 63/1483* (2013.01)

(58) Field of Classification Search
CPC ..................................................... H04L 63/1483
See application file for complete search history.

(56) References Cited

U.S. PATENT DOCUMENTS

| | | | |
|---|---|---|---|
| 7,681,234 B2 | 3/2010 | Florencio et al. | |
| 9,116,877 B2 | 8/2015 | Chandramouli et al. | |
| 10,298,602 B2 * | 5/2019 | Higbee | H04L 63/20 |
| 10,673,894 B2 | 6/2020 | Sjouwerman et al. | |
| 11,303,674 B2 | 4/2022 | Onut et al. | |
| 2016/0014151 A1 * | 1/2016 | Prakash | H04L 47/62 726/22 |

* cited by examiner

Primary Examiner — Huan V Doan
(74) Attorney, Agent, or Firm — Nath, Goldberg & Meyer; Richard C. Litman

(57) ABSTRACT

Detection of phishing messages in network communications is performed by receiving a transmitted message and detecting characteristics of the message. A determination is made if the message matches a pattern of a phishing message in a database, and classifies the message as a phishing or spam message accordingly. If the message does not match a known phishing message pattern, the message is checked for common signs of phishing or spam by determining the severity of a threat embodied by the message, and the message is categorized as having phishing characteristics and according to the severity of threat. In response the user responses to determinations of threats, criteria for detection of phishing characteristics is adjusted, thereby automatically revising criteria for future decisions as to whether the message represents suspected phishing.

12 Claims, 1 Drawing Sheet

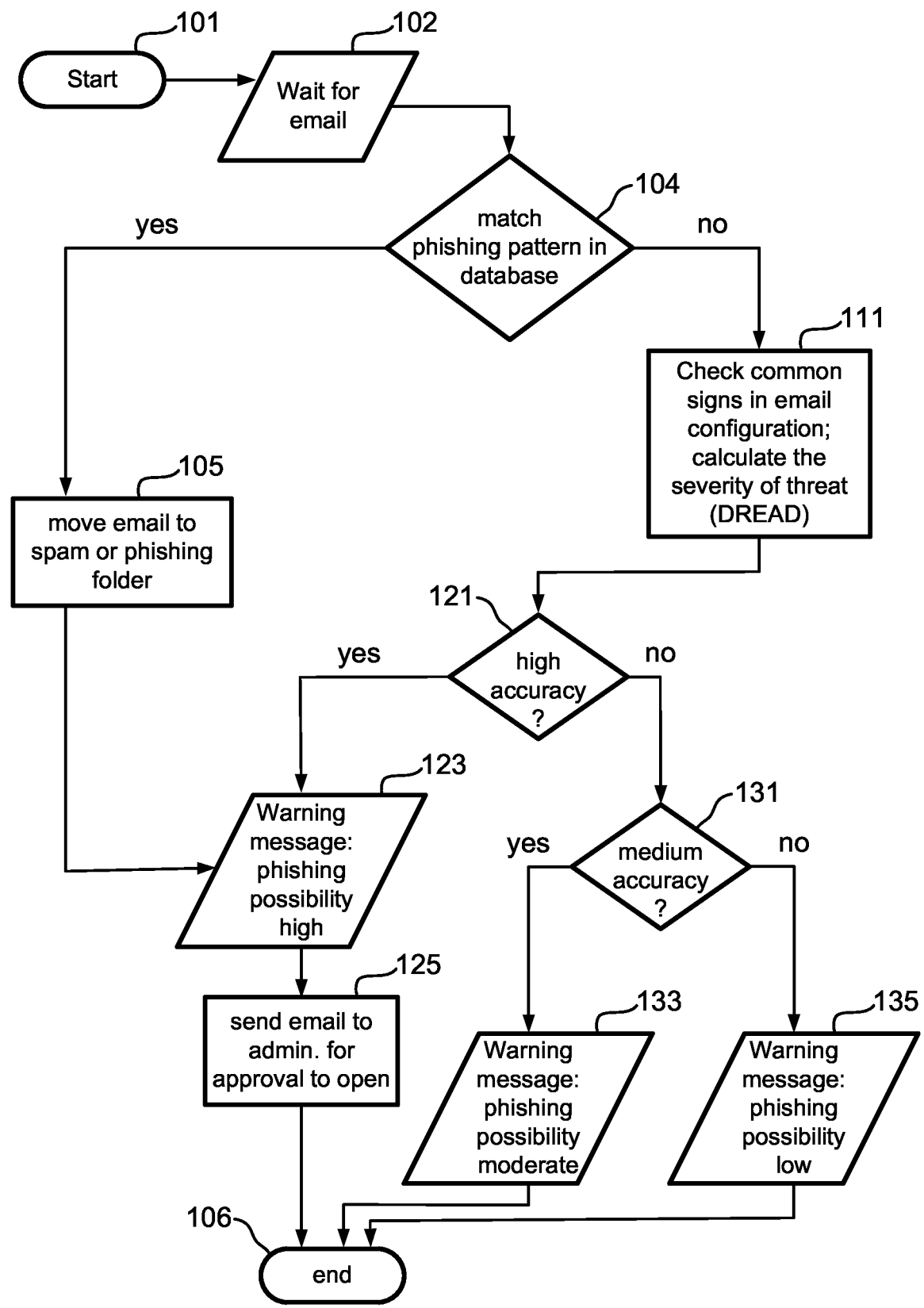

DETECTING AND ANALYZING PHISHING ATTACKS THROUGH ARTIFICIAL INTELLIGENCE

BACKGROUND

Technical Field

The present disclosure relates to anti-spam software and specifically anti-phishing software implementing artificial intelligence.

Background Art

In the field of cybersecurity, "social engineering" is the art of psychologically "hacking" into human response (i.e., persuasion) to obtain sensitive information such passwords and credit cards details, etc. Social engineering relies on the fact that humans are often the weakest link in the information security chain. Regardless of the strength and types of protection available, the chain can be easily broken if a person makes a single wrong decision, leading to security problems where it has been mentioned that most of cybersecurity attacks are due to human error.

Malicious hackers ("computer crackers" and other malicious actors) use different methods of social engineering, however, a fast-growing and very common one is called "phishing". In this technique, malicious actors usually use emails and other forms of communication and present themselves as trusted and authorized sources in order to persuade their targets to respond to their phishing emails. The malicious actor then attempts to steal sensitive information from their victims. Responding to phishing causes significant financial loses, and in some cases, companies can lose their reputation and individuals might lose their jobs.

Conventional anti-spam software (with anti-phishing functionality) analyzes the headers and message use patterns that are previously-identified. This presents an incentive for malicious actors to modify their messages and transmission techniques to evade the previously-identified patterns. Well-known techniques in the past have included variations in the email text, spelling and word structure, although more sophisticated techniques are used. With the development of technologies, hacker tools and skills, phishing emails have become complex and hard to recognize.

One prior approach, represented by U.S. Pat. No. 11,303,674 B2, to Onut, et al., focused on detecting and analyzing phishing attacks through the use of artificial intelligence, in which the possibility of phishing attacks are predicted prior to their deployment. The recipient can obtain a report that includes the standard persuasion strategies used in a phishing email which might influence the reader's behavior and persuade the reader to respond, and includes signs of phishing emails such as poor grammar, spelling mistakes, suspicious links, attachments, incorrect originating email addresses, mismatched URLs, and plagiarism percentages, which are used to identify the severity level of the email threat before responding to it.

SUMMARY

Detection of phishing messages in network communications is performed by receiving a transmitted message and detecting characteristics of the message. A determination is made if the message matches a pattern of a phishing message in a database, and in the case of the message matching a known phishing message, the message is classified as a phishing or spam message and moved to a phishing or spam folder. In the case of the message not matching a known phishing message pattern, the message is checked for common signs of phishing or spam by determining the severity of a threat embodied by the message, and the message is categorized as having phishing characteristics. In the case of a determination of a low probability of phishing characteristics, the message is not further processed for phishing. In the case of a determination of a high or moderate probability of phishing characteristics, the message is classified as presenting signs of a phishing attempt. In the case of a the determination indicating phishing with a high accuracy, the message is classified as presenting signs of a phishing attempt with a high accuracy, and a warning message of a high probability of phishing is sent to the recipient. In the case of a the determination indicating phishing with a moderate or medium accuracy, the message is classified as presenting signs of a phishing attempt with a moderate or medium accuracy, and a warning message of a moderate probability of phishing is sent to the recipient.

In a further configuration, responsive to the user responses to the determinations, criteria for detection of phishing characteristics is adjusted, thereby automatically revising criteria for future decisions as to whether the message represents suspected phishing.

BRIEF DESCRIPTION OF THE DRAWINGS

FIG. 1 is a flow diagram showing the disclosed sequence.

DETAILED DESCRIPTION

Overview

The present disclosure relates to a method and system for detecting and analyzing phishing attacks through the use of artificial intelligence, such that the possibility of phishing attacks is predicted prior to their deployment. By using an AI component, the receiver can obtain a report that includes the standard persuasion strategies used in an email, which might influence the reader's behavior and persuade the reader to respond. In addition the report includes signs of phishing emails such as poor grammar, spelling mistakes, suspicious links, attachments, incorrect originating email addresses, mismatched URLs, and plagiarism percentages, which are used to identify the severity level of the email before responding to it.

The technique includes two stages:
1. identification; and
2. response.

With the development of technologies, hacker tools and skills, phishing emails have become complex and difficult to recognize. Therefore, use of state-of-art technologies can minimize the risk behind the phishing attacks. Artificial intelligence (AI) techniques are used to identify the possibility of phishing before they can be communicated to a recipient. With the support of AI, the recipient can obtain a report that includes the persuasion strategies used in the email, such as authority, social proof, liking, and scarcity, urgency, etc., which are intended to influence individuals' behavior and persuade the victims to respond. In addition, the report includes the signs of a phishing email such as grammar and spelling mistakes, suspicious links and attachments, wrong email address of sender, mismatched URLs, etc., plagiarism percentage, and identifies the severity level of the risk before responding to it.

The disclosed technique filters phishing emails by performing a deep investigation and scanning for the following:
1) Techniques used by phishers that may increase the trustworthiness and acceptance level of phishing emails; and
2) Signs needed to recognize and distinguish real emails from the phishing emails.

According to the present disclosure, a computer processor scans and analyzes received emails for indications of strategies used in phishing email, including deeply analyzing these techniques and signs and then providing a report to the target before responding to these emails to identify persuasion strategies used in the email, such as authority, social proof, liking, and scarcity, urgency, etc., which are able to influence an individuals' behavior and persuade the victims to respond. An identification of these strategies is augmented by the use of AI, in order to gather general information of such persuasion techniques and to further interpret the content of the email to interpret the received email as implementing the persuasion techniques.

Additionally, any kind of organization can benefit from this work to protect their valuable assets from phishing attacks. For example, in the case of business email, if the investigation or scanning process finds that the probability of the received email to be phishing is very high, a report will be sent to the employee's manager and the employee would not be able to respond or would be advised to refrain from responding, to the email until a specialist from a cognizant information security department is able to check and review the email.

Techniques used in a phishing email that may increase the trustworthiness and acceptance level of phishing emails can include:

Phishing emails design techniques—The disclosed technology takes into consideration four keys used in email design that increase the acceptance level and the trustworthiness of phishing emails. Some of these keys may be present in legitimate business communications, but legitimate business communications would follow standard message transfer characteristics. Therefore, messages showing the keys would be strictly scrutinized to determine that the message is transferred in a manner consistent with legitimate message transmission protocols.

Phishing email design characteristics:
Email title—The attractive email title increases the user's motivation to open the emails. Signs used in a title such as an indication of urgency, importance and a business name.
Email argument quality—Email argument quality refers to the strength of the argument embedded in a message. The quality of argument increases the probability that the argument embedded in the message will be accepted. Examples of an email argument may include a response action request, or justification of the request.
Message appearance—Well-designed images will increase the credibility of the message (e.g., Logo).
Assurance mechanism—Signs guaranteeing the information security or privacy increases the trust of recipients. Recipients whose decision are based on assurance cues are at higher risk of becoming victims. Assurance cues include help link/feedback, HTTPS links, and security and privacy policies.
Psychological persuasion techniques—Psychological persuasion techniques that include persuading the internet user to disclose sensitive information are typically the main goal of phishing attacks. Persuasion can influence the user in deciding to perform a particular behaviour such as responding to email. Part of the disclosed technique is to analyze the entire email and discover the persuasion strategies/techniques used by attacker and then inform the target about it. The analysis is augmented with AI because it is often difficult to anticipate the characteristics of particular persuasion techniques. As an example of persuasion techniques, one persuasion strategy is "authority". Authority is based on the idea that if someone is in a position of power, recipients are more likely to respond to the request.

In some cases, some word expression is used to understand which persuasion strategies the attacker may try to use. Common examples are statements intended to generate fear; e.g., "your account will be blocked", words expressing deadlines or urgency; e.g., "if you do not reply within 24 hours". These approaches fall under authority strategies.

Signs used by an attacker to encourage victim to respond to the phishing:
Courtesy
Known sender
Fear
Context
Natural behaviour.

2) Signs used to distinguish real email from the phishing—These are common errors in personal emails but are considered suspect in standard business communications, which are either carefully composed for mass distribution (e.g., notices), or which are composed using scripts. Signs indicative of phishing when found in communications intended to be viewed as legitimate business communication include:
Spelling and bad grammar or syntax
Generic greetings
Mismatched email domains
First time, infrequent senders, or senders marked [External]
Suspicious links or unexpected attachments
Unknown senders Technique FIG. 1 is a flow diagram showing the disclosed sequence. The sequence is initiated on receiving a transmitted message and detecting characteristics of the message. In the example, the messages are emails; however other forms of electronic communication, including SMS messages, "PM" messages, and other forms of electronic messages are treated similarly. The characteristics of the email can be the message text, the message text with formatting, images, image conversions, video sequences and other forms of network-transmitted communication. Also included are text equivalents such as a Cyrillic character that shares the general appearance of a Latin character in Latin text (or vice-versa). Some of these characteristics can, by themselves, be spam indicators, such as mixing look-alike Latin and Cyrillic characters. Other characteristics are part of the normal intended text, such as an Arabic or Cyrillic word or expression in a non-Cyrillic sentence.

Other characteristics would include URLs, including look-alike URLs, images, images representing text and other information transmitted in a message.

An important characteristic of the message includes metadata information, especially metadata information in the transport headers. For example, a message from Microsoft would probably be received from the location of a Microsoft facility and initially transmitted via Microsoft's servers. A message alleging the source being a known friend, associate or other entity would probably originate from a location and source that matches that entity's prior communications or geographical locations. These transmission routes can vary, but by the use of feedback, described infra, the viability and legitimacy of the alternate routes can be determined. It is also possible to use the reputation of the alternate route, such as a financial entity, in evaluating an alternate transmission route. This data is provided to the system, which initiates a Start routine (step 101).

After Start (step 101), the system waits for an email (step 102) and determines if the email matches a pattern of a phishing email in a database (step 104). If the email matches a known phishing email, the email is classified as a phishing or spam email and is moved to a phishing or spam folder (step 105), and completing the sequence (step 106) for that email. While this completes the sequence for that email, subsequent recipient actions are fed back to the system for refinement of the algorithm.

If the email does not match a known phishing email pattern, the email is checked for common signs of phishing or spam by determining the severity of the threat embodied by the email, using the DREAD threat modeling criteria (step 111). This results in a categorization of the email as having phishing characteristics. The DREAD threat modeling criteria references five categories for rating security threats:

Damage—how bad would an attack be?
Reproducibility—how easy is it to reproduce the attack?
Exploitability—how much work is it to launch the attack?
Affected users—how many people will be impacted?
Discoverability—how easy is it to discover the threat?

If the determination of phishing characteristics is low, then the email is not further processed for phishing, but may still be processed according to other spam detection processes (not shown). In the event that the email shows signs of phishing, a determination (step 121) is made as to whether the signs of phishing indicate phishing with a high accuracy. If the determination in step 121 is that the detection is of high accuracy, a warning message is sent (step 123) that the possibility of the email being a phishing email is high. The warning would be that the possibility of the email being a phishing email is high, or the email would be blocked pending administrator review. The user would be warned not to open any URLs or attachments received with that email. The email would be forwarded to an administrator (step 125) or, if the intended recipient dismisses the email, the email would simply be deleted. The response of the user or administrator would be provided to recognize further similar emails as meeting a pattern of phishing or inclusion in the database.

If the determination in step 121 is that the detection is not of high accuracy a determination (step 131) is made as to whether the detection of phishing is of either moderate or medium accuracy. In the event the determination of phishing in step 131 is that the email is of either moderate or medium accuracy, a warning message is sent that the possibility of being a phishing email is moderate (step 133). In the event the determination of phishing in step 131 is that the email is not of either moderate or medium accuracy, this is considered to be a low accuracy warning. In this case, a warning message is sent that there is a possibility of being a phishing email, but that the possibility is low (step 135).

The difference between a warning message of a high possibility of the email being a phishing email or a moderate or low possibility of the email being a phishing email is that, while both serve as a warning, the recipient may address the warnings differently. In the cases of a warning message that the possibility is moderate (step 133) or low (step 135), the warning is considered sufficient to alert that the email has been determined to be suspicious, which would alert the recipient to exert an appropriate degree of caution.

The determination of the severity of the threat (step 111) includes two primary tasks:

1—tokenizing: Will use a neural network such as Recurrent Neural Network (RNN), a deep-learning model that aims to deal with neural network processing and speech recognition, or Long Short-Term Memory (LSTM), . . . etc.

2—classification: Transformer. A Transformer is a neural network architecture that learns context from texts. One example is the Bidirectional Encoder Representations from Transformers (BERT language model) used in natural language processing. BERT was introduced in October 2018 by researchers at Google and is implanted by huggingface (Hugging Face, Inc., New York). A transformer is a deep learning architecture based on the multi-head machine learning attention mechanism. Machine learning-based attention is a mechanism which intuitively mimics cognitive attention. It calculates "soft" weights for each word, more precisely for its embedding, in the context window, and is used to train large language model (LLM) datasets. The use of BERT is given as a non-limiting example of transformer architecture, and any suitable transformer architecture can be used.

This is accomplished by email text processing, and content and link detection. Email text processing addresses text patterns and words, and includes text manipulation by converting text to lowercase and stripping out special characters, numbers, and stop words that could obfuscate the message intended to be conveyed by the text. By way of non-limiting examples, this would use a Masked Language Model (MLM) RegEx, and a text detection library such as Pandas, scikit-learn, Re and/or a Natural Language Toolkit (NLTK). Pandas is a software library written for the Python programming language for data manipulation and analysis. In particular, it offers data structures and operations for manipulating numerical tables and time series. Scikit-Learn is a free software machine-learning library for the Python programming language.

The NLTK is a suite of libraries and programs for symbolic and statistical natural language processing for English written in the Python programming language. It supports classification, tokenization, stemming, tagging, parsing, and semantic reasoning functionalities.

By way of non-limiting examples, URL detection, fraud detection and virus software can be detected by characteristics of multilevel marketing (MLM) and/or indications provided by Bidirectional Encoder Representations from Transformers, such as (by way of non-limiting example) BERT. Examples of fraud detection libraries include Torch (an open-source machine learning library, a scientific computing framework, and a scripting language based on Lua), TensorFlow (a free and open-source software library for machine learning and artificial intelligence, developed by Google Brain Team), transformers, or huggingface.

Data pre-processing for text includes removing HTML Tags, numbers, punctuation, stop words, infrequent words, and stemming. By way of non-limiting examples, this would include tokenizing.

While the above description indicates moving suspected phishing emails to a phishing filter, the system can be configured to use a spam filter or other notification systems provided by anti-spam software or other message handling software to store the diverted phishing email. Advantageously, phishing emails would be flagged as such so that they can be identified in the spam folder and handled appropriately by the recipient.

Feedback Loop

A basic approach of email phishing is to present requests for information, either directly or through links, in a manner that mimics requests from trusted sources. This is similar to the approach of non-phishing spam, except that the efforts focus on obtaining compliance from the targeted recipients or "marks". These efforts are the focus of phishing detection by the disclosed technique.

In some cases, such as the email matching a pattern of a phishing email in a database at step 104 and therefore classified as phishing or spam, the decision is made; however, if the recipient reviews the phishing or spam folder (after the email is moved to a phishing or spam folder in step 105), the information that the email is not phishing or spam is fed back for revision of the database. In the case of a determination in step 121 of moderate or low probabilities of the email being a phishing email, recipient rejections of the determinations (i.e., that the email may be safe) are evaluated to the extent possible. In some cases, the recipient wants to review the email but does not consider the email safe, so further actions by the recipient would be monitored, including detecting responses to the email, the nature of the responses and other characteristics. If there are detectable indications that the recipient considers the email safe, further data from the email, such as headers, sources, header match with other email received by the recipient, etc., are analyzed, and incorporated into future decisions in steps 105 and 121. By way of non-limiting example, an email detected from a known alternative source, such as from a different device, may be considered safe if particular criteria are detected. These criteria may be inherent in the transmission, or may relate to external factors, such as geographical locations.

The use of feedback loops allows the system to automatically revise its criteria for future decisions in steps 105 and 121 as to whether the email represents suspected phishing.

CLOSING STATEMENT

It will be understood that many additional changes in the details, materials, steps and arrangement of parts, which have been herein described and illustrated to explain the nature of the subject matter, may be made by those skilled in the art within the principle and scope of the invention as expressed in the appended claims.

What is claimed is:

1. A method for detecting phishing messages in network communications, the method comprising:
 receiving a transmitted message and detecting characteristics of the message;
 determining if the message matches a pattern of a phishing message in a database;
 in the case of the message matching a known phishing message, classifying the message as spam or a phishing message and moved to a phishing or spam folder;
 in the case of the message not matching a known phishing message pattern, checking the message for common signs of phishing or spam by determining the severity of a threat embodied by the message, and categorizing the message as having phishing characteristics;
 in the case of a determination of a low probability of phishing characteristics, not further process the message for phishing;
 in the case of a determination of a high or moderate probability of phishing characteristics, classifying the message as presenting signs of a phishing attempt;
 in the case of a determination indicating phishing with a high accuracy, classifying the message as presenting signs of a phishing attempt with a high accuracy, and sending a warning message of a high probability of phishing to the recipient; and
 in the case of a determination indicating phishing with a moderate or medium accuracy, classifying the message as presenting signs of a phishing attempt with a moderate or medium accuracy, and sending a warning message of a moderate probability of phishing.

2. The method of claim 1, wherein message text processing addresses text patterns and words, and includes text manipulation by converting text to lowercase and stripped of special characters, numbers, and stop words that could obfuscate the message intended to be conveyed by the text, and wherein analysis of metadata comprises information in transport headers of the message.

3. The method of claim 2, further comprising:
 receiving user responses to determinations of the high or moderate probability of phishing characteristics; and
 responsive to the user responses to the determinations, adjusting criteria for detection of phishing characteristics, thereby automatically revising criteria for future decisions as to whether the message represents suspected phishing.

4. The method of claim 2, further comprising:
 the detecting characteristics of the message comprising performing transformations on the message, and the determining if the message matches a pattern of of a phishing message comprising analyzing the message based on the transformations;
 receiving user responses to determinations of the probability of phishing characteristics; and
 responsive to the user responses to the determinations, adjusting criteria for detection of phishing characteristics, thereby automatically revising criteria for future decisions as to whether the message represents suspected phishing.

5. The method of claim 1, further comprising:
 receiving user responses to determinations of the high or moderate probability of phishing characteristics; and
 responsive to the user responses to the determinations, adjusting criteria for detection of phishing characteristics, thereby automatically revising criteria for future decisions as to whether the message represents suspected phishing.

6. The method of claim 1, further comprising:
 the detecting characteristics of the message comprising performing transformations on the message, and the determining if the message matches a pattern of of a phishing message comprising analyzing the message based on the transformations;
 receiving user responses to determinations of the probability of phishing characteristics; and
 responsive to the user responses to the determinations, adjusting criteria for detection of phishing characteristics, thereby automatically revising criteria for future decisions as to whether the message represents suspected phishing.

7. A non-transitory storage medium storing instructions that, when executed on a processor, performs a method for detecting phishing messages in network communications, the method comprising:

a first step of receiving a transmitted message and detecting characteristics of the message;

a second step of determining if the message matches a pattern of a phishing message in a database;

a third step of, in the case of the message matching a known phishing message, classifying the message as a phishing or spam message and moved to a phishing or phishing or spam folder, and in the case of the message not matching a known phishing message pattern, checking the message for common signs of phishing or spam by determining the severity of a threat embodied by the message, and categorizing the message as having phishing characteristics, and in the case of a determination of a low probability of phishing characteristics not further process the message for phishing;

a fourth step of, in the case of a determination of a high or moderate probability of phishing characteristics, classifying the message as presenting signs of a phishing attempt; and a fifth step of, in the case of a determination indicating phishing with a high accuracy, classifying the message as presenting signs of a phishing attempt with a high accuracy, and sending a warning message of a high probability of phishing to the recipient, and in the case of a determination indicating phishing with a moderate or medium accuracy, classifying the message as presenting signs of a phishing attempt with a moderate or medium accuracy, and sending a warning message of a moderate probability of phishing.

8. The non-transitory storage medium of claim 7, wherein message text processing addresses text patterns and words, and includes text manipulation by converting text to lowercase and stripped of special characters, numbers, and stop words that could obfuscate the message intended to be conveyed by the text, and wherein analysis of metadata comprises information in transport headers of the message.

9. The non-transitory storage medium of claim 8, further storing instructions for:

receiving user responses to determinations of the high or moderate probability of phishing characteristics; and responsive to the user responses to the determinations, adjusting criteria for detection of phishing characteristics, thereby automatically revising criteria for future decisions as to whether the message represents suspected phishing.

10. The non-transitory storage medium of claim 8, further storing instructions for:

receiving user responses to determinations of the probability of phishing characteristics; and responsive to the user responses to the determinations, adjusting criteria for detection of phishing characteristics, thereby automatically revising criteria for future decisions as to whether the message represents suspected phishing;

wherein the detecting characteristics of the message comprising performing transformations on the message, and wherein the determining if the message matches a pattern of a phishing message comprising analyzing the message based on the transformations.

11. The non-transitory storage medium of claim 7, further storing instructions for:

receiving user responses to determinations of the high or moderate probability of phishing characteristics; and responsive to the user responses to the determinations, adjusting criteria for detection of phishing characteristics, thereby automatically revising criteria for future decisions as to whether the message represents suspected phishing.

12. The non-transitory storage medium of claim 7, further storing instructions for:

receiving user responses to determinations of the probability of phishing characteristics; and responsive to the user responses to the determinations, adjusting criteria for detection of phishing characteristics, thereby automatically revising criteria for future decisions as to whether the message represents suspected phishing;

wherein the detecting characteristics of the message comprising performing transformations on the message, and wherein the determining if the message matches a pattern of a phishing message comprising analyzing the message based on the transformations.

* * * * *